US012462629B2

(12) United States Patent
(10) Patent No.: US 12,462,629 B2
(45) Date of Patent: Nov. 4, 2025

Bucci

(54) LOTTERY TICKET VENDING MACHINE

(71) Applicant: Brightstar Global Solutions Corporation, Providence, RI (US)

(72) Inventor: Paul A Bucci, Glocester, RI (US)

(73) Assignee: Brightstar Global Solutions Corporation, Providence, RI (US)

( * ) Notice: Subject to any disclaimer, the term of this patent is extended or adjusted under 35 U.S.C. 154(b) by 285 days.

(21) Appl. No.: 18/295,901

(22) Filed: Apr. 5, 2023

(65) Prior Publication Data

US 2024/0338990 A1 Oct. 10, 2024

(51) Int. Cl.

| | |
|---|---|
| ***G07B 3/02*** | (2006.01) |
| ***G07B 5/02*** | (2006.01) |
| ***G07B 5/08*** | (2006.01) |
| ***G07C 15/00*** | (2006.01) |

(52) U.S. Cl.

CPC ............. *G07C 15/005* (2013.01); *G07B 3/02* (2013.01); *G07B 5/02* (2013.01); *G07B 5/08* (2013.01)

(58) Field of Classification Search

CPC .... G07B 5/02; G07B 5/08; G07B 3/02; G07F 11/10; G07F 11/68; G07C 15/005

See application file for complete search history.

(56) References Cited

U.S. PATENT DOCUMENTS

| | | | |
|---|---|---|---|
| 3,855,457 | A | 12/1974 | Amundson et al. |
| 5,222,624 | A | 6/1993 | Burr |
| 5,408,417 | A | 4/1995 | Wilder |
| 5,836,498 | A | 11/1998 | Turek |
| 6,609,644 | B1 | 8/2003 | Menna |
| 6,712,253 | B2 | 3/2004 | Hargrave et al. |
| 6,714,838 | B2 | 3/2004 | Scrymgeour et al. |
| 6,726,077 | B2 | 4/2004 | Roberts et al. |
| 7,032,774 | B2 | 4/2006 | Boehm et al. |
| 7,383,099 | B2 | 6/2008 | Pollard et al. |
| 7,562,798 | B2 | 7/2009 | Bartolone et al. |
| 7,665,394 | B2 | 2/2010 | Roberts et al. |
| 7,850,257 | B2 | 12/2010 | Roberts et al. |
| 8,127,973 | B2 | 3/2012 | Mirkovic et al. |
| 8,192,268 | B1 | 6/2012 | Karpe |
| 8,210,921 | B1 | 7/2012 | Karpe |
| 8,534,524 | B2 | 9/2013 | Businger et al. |

(Continued)

OTHER PUBLICATIONS

"Extended European Search Report", from corresponding European Patent Application No. 24161728.1, Jun. 10, 2024.

*Primary Examiner* — Robert E Mosser

(74) *Attorney, Agent, or Firm* — Neal, Gerber & Eisenberg LLP

(57) ABSTRACT

An instant lottery ticket vending machine configured to determine if its ticket bursters are improperly separating the lottery tickets received from the ticket drawers of the ticket drawer columns, and to make one or more adjustments and/or alert an operator if its ticket bursters are improperly separating the lottery tickets. In various embodiments, each of the tickets bursters includes a suitable ticket edge sensor configured to sense an edge (such as a leading edge) of each lottery ticket received in such ticket burster. In various embodiments, the lottery ticket vending machine includes one or more controllers configured to receive such signals from the ticket edge sensor and make such determinations regarding any adjustments and/or alerts, and to cause any such adjustments and/or alerts.

20 Claims, 10 Drawing Sheets

(56) References Cited

U.S. PATENT DOCUMENTS

| | | | |
|---|---|---|---|
| 8,550,294 B2 | 10/2013 | Martin | |
| 9,613,337 B1 | 4/2017 | Garrison | |
| 9,685,026 B1 | 6/2017 | Garrison | |
| 10,438,452 B2 | 10/2019 | Ferron et al. | |
| 11,010,987 B2 | 5/2021 | Bucci | |
| 2003/0120381 A1 | 6/2003 | Perin et al. | |
| 2004/0000572 A1 | 1/2004 | Engelhardt, Jr. et al. | |
| 2005/0178810 A1 | 8/2005 | Woods et al. | |
| 2007/0017978 A1 | 1/2007 | Ho | |
| 2007/0088459 A1 | 4/2007 | Pollard et al. | |
| 2010/0308071 A1 | 12/2010 | Businger | |
| 2011/0071668 A1* | 3/2011 | Lin | G07F 9/026 700/231 |
| 2014/0008407 A1 | 1/2014 | Bucci et al. | |
| 2016/0232741 A1 | 8/2016 | Assis et al. | |
| 2018/0186558 A1 | 7/2018 | Mejenborg et al. | |
| 2022/0108562 A1 | 4/2022 | Claude et al. | |
| 2022/0114842 A1 | 4/2022 | Mejenborg et al. | |
| 2022/0114860 A1 | 4/2022 | Mejenborg et al. | |
| 2024/0021054 A1 | 1/2024 | Topalian et al. | |

* cited by examiner

LOTTERY TICKET VENDING MACHINE

BACKGROUND

The present disclosure relates to lottery ticket vending machines.

Lottery tickets such as instant lottery tickets may be printed on a strip that may be rolled or fan-folded and provided as a pack of lottery tickets. Lottery tickets in such strips may be separated along perforations formed between adjacent tickets in the strips. Lottery tickets may vary in width and length. Lottery tickets may be sold from such packs using lottery ticket vending machines.

BRIEF SUMMARY

In various embodiments, the present disclosure relates to a lottery ticket vending machine including: a housing; a ticket drawer column in the housing, the ticket drawer column including a plurality of ticket drawers, each of the ticket drawers configured to hold a strip of lottery tickets; a ticket burster in the housing, the ticket burster defining a ticket inlet and a ticket outlet, the ticket burster movable to a plurality of different ticket receipt positions, each different ticket receipt position associated with and in alignment with a different one of the ticket drawers; a ticket edge sensor supported by the ticket burster, configured to obtain ticket edge image data for a lottery ticket that moves from one of the ticket drawers into the ticket burster, and configured to transmit the ticket edge image data; and a controller. The controller is configured to receive the ticket edge image data from the ticket edge sensor, determine if any part of an edge of the lottery ticket has a deformity, and cause a corrective action to be taken responsive to determining that the edge of the lottery ticket has the deformity.

In various other embodiments, the present disclosure relates to a lottery ticket vending machine including: a housing; a ticket drawer column in the housing, the ticket drawer column including a plurality of ticket drawers, each of the ticket drawers configured to hold a strip of lottery tickets; a ticket burster in the housing, the ticket burster defining a ticket inlet and a ticket outlet, the ticket burster movable to a plurality of different ticket receipt positions, each different ticket receipt position associated with and in alignment with a different one of the ticket drawers; a ticket cutter supported by the ticket burster; a ticket edge sensor supported by the ticket burster; and a controller. The ticket edge sensor is configured to obtain ticket edge image data for a lottery ticket that moves from one of the ticket drawers into the ticket burster, and configured to transmit the ticket edge image data. The ticket edge sensor includes one of a camera and an optical sensor. The ticket edge sensor is positioned in the ticket burster such that the ticket edge sensor can sense a leading edge of the lottery ticket before the cutter cuts perforations connecting the lottery ticket to a next lottery ticket of the strip of lottery tickets. The controller is configured to receive the ticket edge image data from the ticket edge sensor, determine if the leading edge of the lottery ticket has a deformity based on the ticket edge image data, and cause a corrective action to be taken responsive to determining that the leading edge of the lottery ticket has the deformity.

In various other embodiments, the present disclosure relates to a lottery ticket vending machine including: a housing; a lottery ticket drawer supported by the housing; a ticket burster supported by the housing; a sensor supported by the housing; and a controller supported by the housing.

The controller is configured to operate with the sensor to determine if the ticket burster is properly separating lottery tickets received from the ticket drawer, and to cause a corrective action to be taken responsive to determining that the ticket burster is improperly separating the lottery tickets.

Additional features are described in, and will be apparent from, the following Detailed Description and the figures.

DETAILED DESCRIPTION

Figure 1A:
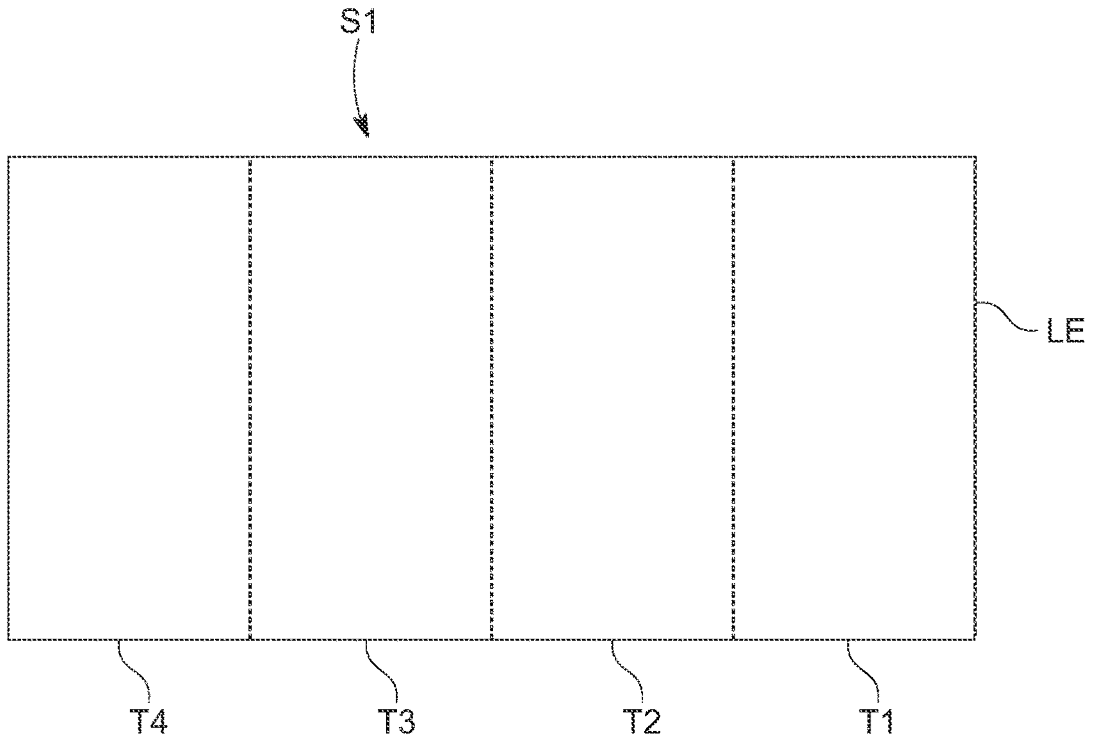
FIG. 1A is a diagrammatic view of a strip of attached lottery tickets having a leading lottery ticket that has a straight leading edge with no deformities.

In various embodiments, the present disclosure relates to a lottery ticket vending machine that is configured to determine if any of its ticket bursters are improperly separating the lottery tickets received from its ticket drawers of its ticket drawer columns, and to make one or more adjustments and/or alert an operator if any of its ticket bursters are improperly separating the lottery tickets. In various embodiments, each of the ticket bursters of the lottery ticket vending machine includes a suitable ticket edge sensor configured to obtain an image of an entire edge (such as an entire leading edge) of each lottery ticket received in such ticket burster. In various embodiments, the lottery ticket vending machine includes one or more controllers configured to receive image data from the ticket edge sensors, analyze such image data, and make such determinations regarding any adjustments and/or alerts, and to cause any such adjustments and/or alerts to be made.

For a better understanding of the present disclosure, example instant lottery tickets are first generally described herein.

Various known instant lottery tickets are single game instant lottery tickets. An example single game instant lottery ticket can include: (1) a ticket substrate have a front surface and a back surface; (2) a predefined scratch-off area on the front surface; (3) variable lottery game indicia printed on the predefined scratch-off area; (4) a scratch-off coating ("SOC") covering the variable lottery game indicia and the predefined scratch-off area; and (5) variable instant lottery ticket information indicia printed on the back surface. The instant lottery ticket information indicia can include text, one or more ticket numbers, one or more ticket codes (such as barcodes), and other instant lottery ticket information that is in human readable and machine readable forms. Certain of this instant lottery ticket information: (a) identifies the instant lottery ticket; (b) the set, run, and/or pack of instant lottery tickets that the instant lottery ticket is part of; and (c) other inventory control information. Various known single game instant lottery tickets include multiple predefined scratch-off areas, multiple sets of variable lottery game indicia printed on the predefined scratch-off areas, and multiple SOCs covering the variable lottery game indicia sets. Various known instant lottery tickets are multi-game instant lottery tickets and can be larger than single game tickets. Instant lottery tickets can also be of the known pull tab type. Instant lottery tickets can have a width that varies from 2 to 4 inches and a length that varies from 2 to 12 inches. The term lottery ticket as used herein is intended to cover these various different types and other types of lottery tickets that can be dispensed in a same or similar manner as these types of lottery tickets.

Various lottery tickets are often arranged after manufacture (which includes after complete printing) in lottery ticket packs for storage, organization, sorting, picking, shipping to lottery ticket distributors or ticket retailers, and validation. Instant lottery ticket packs can include a plurality of lottery tickets (that are all of the same type, same size, and for the same game(s), and can be protected for storage and shipping by a transparent pack wrapping, such as transparent plastic wrapping, securely wrapped around the plurality of lottery tickets. A pack of lottery tickets can include all of the lottery tickets attached to each other but joined by perforations. Such lottery tickets of a pack can be detached from each other along such perforations. While tickets of each pack are often manufactured in a continuous strip that is fan-folded for convenient supply, the packs can be in other forms such as in a roll form. These packs in the fan-folded form or in the roll form are configured to dispensing via a lottery ticket vending machine.

FIG. 1A shows part of an example strip S1 of attached lottery tickets having four connected lottery tickets T1, T2, T3, and T4 respectively attached by perforations (not labeled), wherein lottery ticket T1 is a leading lottery ticket in the strip S1 and has a leading edge LE that is straight and without any deformities.

Figure 1B:
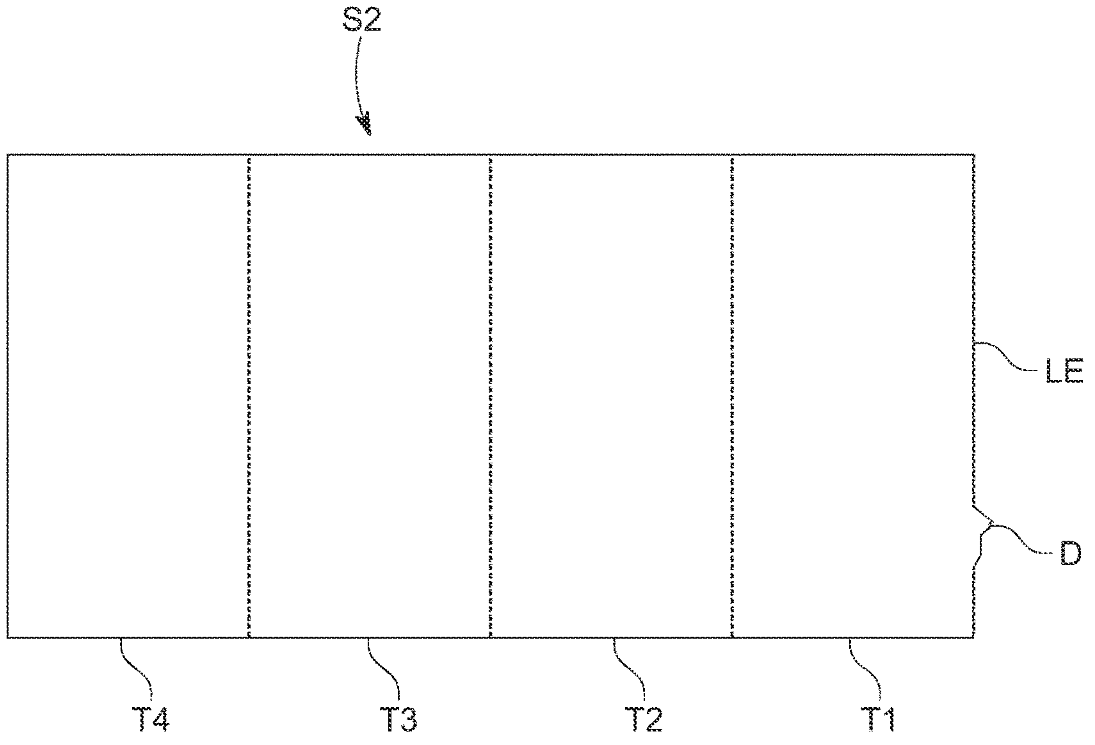
FIG. 1B is a diagrammatic view of a strip of attached lottery tickets having a leading lottery ticket that has a non-straight leading edge with an outwardly extending deformity.

FIG. 1B shows part of an example strip S2 of attached lottery tickets having four connected lottery tickets T1, T2, T3, and T4 respectively attached by perforations (not labeled), wherein lottery ticket T1 is a leading lottery ticket in the strip S2 and has a leading edge LE that has an example deformity D and is thus not straight. Deformities (such as example deformity D) can be caused due to many different reasons and can be at any one or more different locations along the leading edge of a lottery ticket. The reasons such deformities can occur include, but are not limited to: (1) improper separations such as cutting of the perforations such as by a cutter of a ticket burster of the lottery ticket vending machine (such as due to a damaged or misaligned cutter); (2) a misalignment of the lottery tickets in a ticket drawer that leads to a misalignment of the lottery tickets as they are fed into a ticket burster; (3) a misalignment of the ticket burster relative to a ticket drawer that feeds the lottery tickets into the ticket burster; (4) misaligned feeding of the lottery tickets by the lottery ticket engagers (such as the driven rollers) of the ticket burster that move or guide the lottery ticket in the ticket burster; and (5) difficult to cut tickets based on poor perforations, ticket quality (such as paper stock issues), or other issues. If the deformity is due to a misalignment issue, in certain instances, the deformities can progressively become worst as the misalignment propagates along a lottery ticket strip. Additionally, if the vending machine uses the cut leading edge of the ticket as a reference point to locate and cut the perforation at the trailing edge of the ticket to disconnect that ticket from the next ticket, the deformity in or at the leading edge can cause the vending machine to make such cut at an incorrect position because the reference point would not be correct. Additionally, in certain instances, a deformity can cause an important part of a lottery ticket to be missing-which in turn can cause a winning lottery ticket to be invalid or not redeemable due to such missing part.

Accordingly, various embodiments of the present disclosure provide a lottery ticket vending machine that obtains an image of the entire edge (such as the entire leading edge) of the lottery ticket, analyzes the image (such as using machine vision) to determine any such deformities along that entire edge, and takes corrective actions such as making adjustments to one or more components of the vending machine to address such deformity causing issue(s), and/or provides one or more alerts to an operator of the vending machine that enables the operator to fix such deformity causing issue(s). It should be appreciated that these actions including the alerts can be suitably tracked and stored (such as by the controller or a remote system) for future reference and use.

Turning now to FIGS. 2, 3, 4, 5, 6A, 6B, 7, 8, and 9, a lottery ticket vending machine of one example embodiment of the present disclosure is generally illustrated and indicated by numeral 100. The lottery ticket vending machine 100 may be referred to herein as the "ticket vending machine" or the "vending machine" for brevity.

The illustrated example ticket vending machine 100 includes: (a) a machine housing 110 including a front door 200; (b) three ticket drawer columns 300*a*, 300*b*, and 300*c* positioned in and supported by the machine housing 110; and (c) three separate and independently movable ticket bursters 400*a*, 400*b*, and 400*c* positioned in the machine housing 110 and supported by burster supports (not labeled) positioned in and supported by the machine housing 110. The front door 200 includes a ticket collection receptacle 250 configured to receive separated lottery tickets from each of the ticket bursters 400*a*, 400*b*, and 400*c*. The quantity, positions, sizes, and configurations of the ticket drawer columns and the ticket bursters can vary in accordance with the present disclosure.

It should be appreciated that the ticket vending machine 100 includes various other components that are conventional in the industry and/or that would be readily apparent to those of ordinary skill in the art. For example, the ticket vending machine 100 can include: (1) various electronic components (not shown) some of which can be contained in an electronic component holder (not labeled) positioned in and supported by the machine housing 110; and (2) various purchaser interface components (not labeled) that are part of the front door 200 of the machine housing 110. These components are only briefly described herein for brevity. Such electronic components can be arranged in any suitable manner. The electronic component holder can be in the form or a slide-out drawer to facilitate access to the various electronic components contained therein. The electronic components can form part of the control system for the ticket vending machine 100. Various electronic components can also be positioned in the machine housing 110 outside of the electrical component holder. The electronic components can include one or more controllers that control the operation of the ticket vending machine 100 including the movable ticket bursters 400*a*, 400*b*, and 400*c* as further discussed herein to facilitate the dispensing of each requested lottery ticket and the determination of any deformities in the edges of the lottery tickets (as further described below). The controller(s) can be any suitable type of controller (such as a programmable logic controller) that includes any suitable processing device(s) (such as a microprocessor, a microcontroller-based platform, an integrated circuit, or an application-specific integrated circuit) and any suitable memory device(s) (such as random access memory, read-only memory, or flash memory). The memory device(s) store(s) instructions executable by the processing device(s) to control operation of the ticket vending machine 100. The purchaser interface components include one or more display devices, one or more input devices, and one or more payment acceptors. The purchaser interface components enable purchasers to use such components to determine the lottery tickets available from the ticket vending machine 100, and to select and pay for any of those lottery tickets held by the ticket vending machine 100 that the purchaser desires to obtain. The purchaser interface components can display images and information to inform purchasers of the different lottery tickets available from the ticket vending machine 100 and to assist in completing the selection and purchase of such lottery tickets. These electronic components and purchaser interface components can take many different forms as well known in the industry, and are thus not described in detail herein for brevity.

Figure 2:
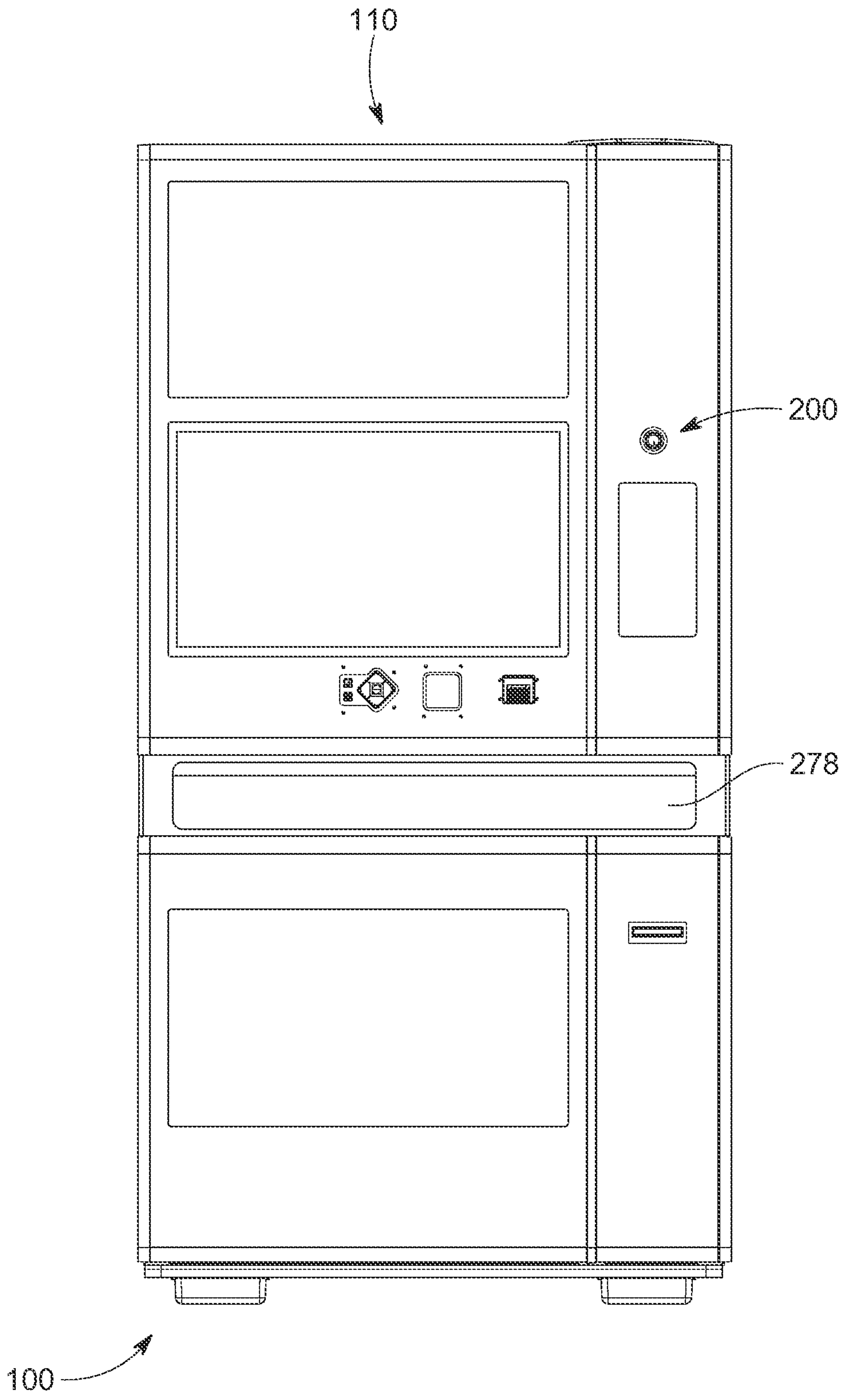
FIG. 2 is a front perspective view of a lottery ticket vending machine of one example embodiment of the present disclosure shown with a front door thereof in a closed position.
Figure 3:
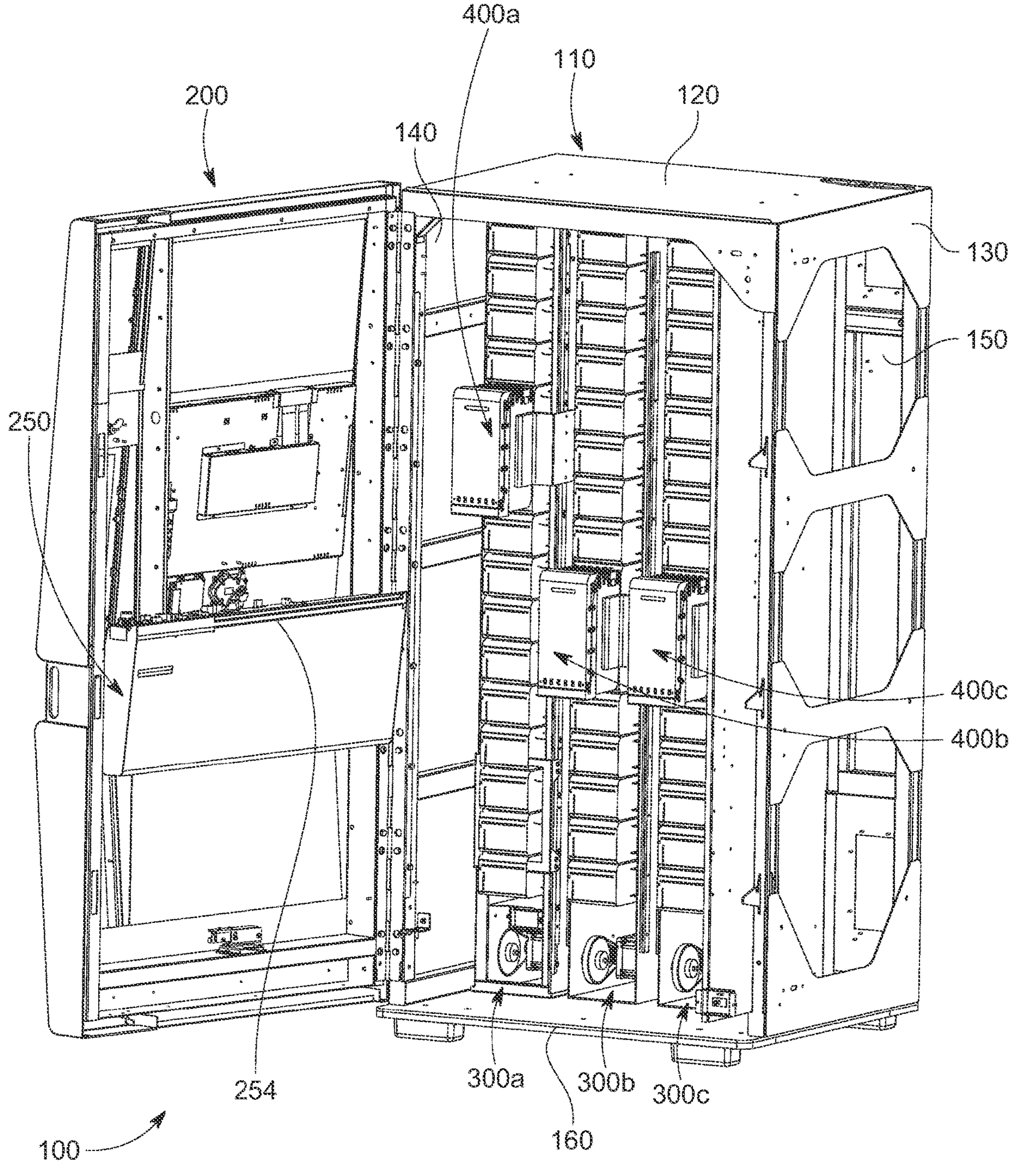
FIG. 3 is a front perspective view of the lottery ticket vending machine of FIG. 2 shown with the front door thereof in an open position, shown with a left side wall panel thereof removed, showing three ticket drawer columns and three movable ticket bursters respectively associated the three ticket drawer columns, and showing a ticket collection receptacle of the front door.
Figure 4:
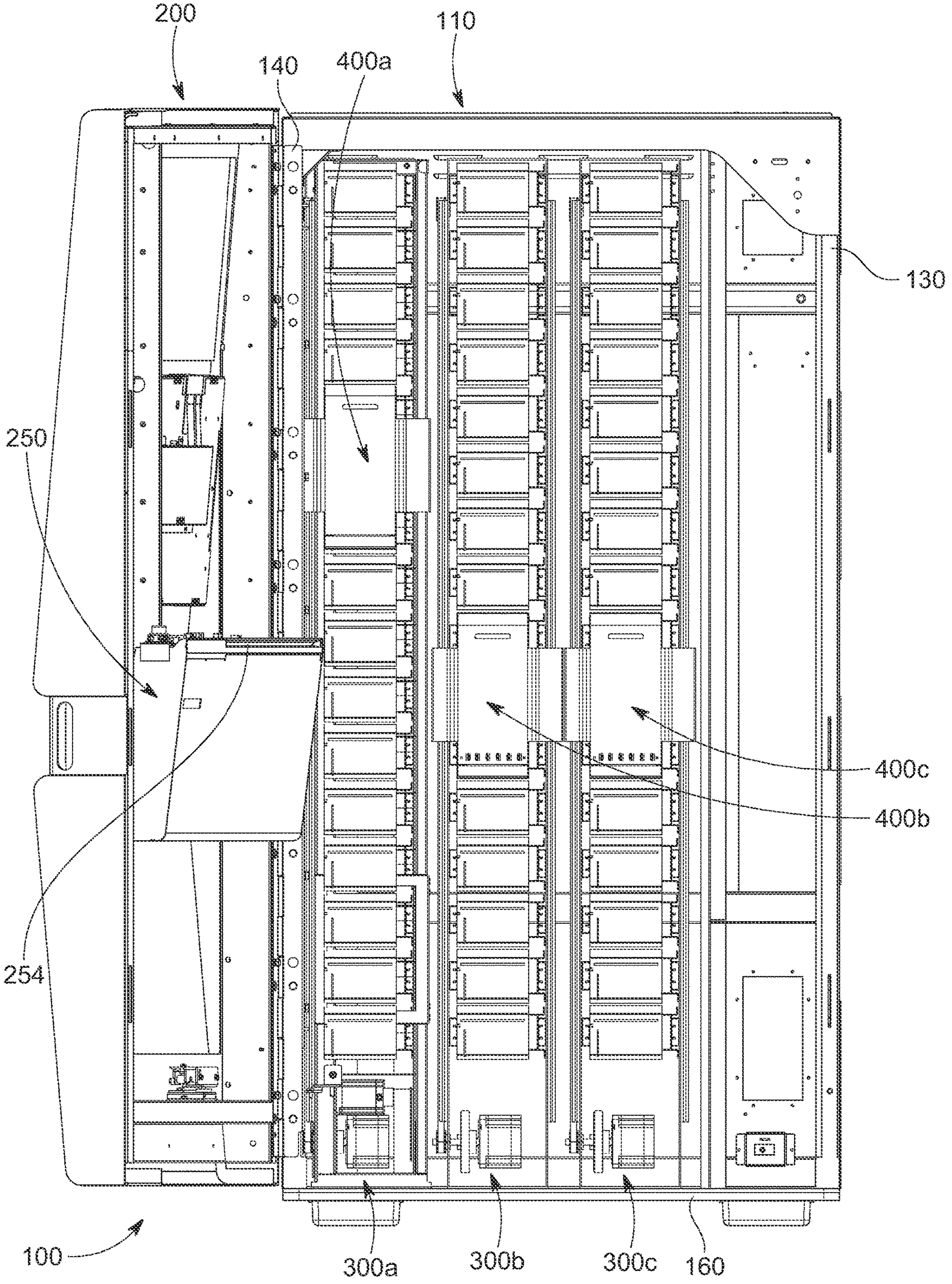
FIG. 4 is a front view of the lottery ticket vending machine of FIG. 2 shown with the front door thereof in the open position, shown with the left side wall panel thereof removed, showing the three ticket drawer columns and the three movable ticket bursters respectively associated the three ticket drawer columns, and showing the ticket collection receptacle of the front door.

In this illustrated example embodiment, the machine housing 110 includes a top wall 120, spaced-apart side walls 130 and 140, a rear wall 150, a base 160, and the openable front door 200 pivotally connected to the side wall 140. The base 160 is configured to rest on a floor or other suitable support. The machine housing 110 includes suitable vertically extending supports (not labeled) configured to hold and support the respective ticket drawer columns 300*a*, 300*b*, and 300*c*. The front door 200 is moveable from a closed and locked position covering the open front face of the machine housing 110 as shown in FIG. 2 to an open position allowing access to the interior of the machine housing 110 as shown in FIGS. 3 and 4. The front door 200 is mounted by hinges (not labeled) to the side wall 140 of the machine housing 110. A suitable locking mechanism (not shown) is mounted on the front door 200 and the side wall 130 of the machine housing 110 to facilitate locking of the front door 200 in the closed position. When the front door 200 is closed and locked, the interior of the machine housing 110 is generally secured so as to be inaccessible except by an authorized person. The front door 200 can include one or more areas for any components supported by the front door and/or that are contained in and/or protected by the structure of the front door 200. The front door 200 can include one or more openings such as for a glass panel that enables people to see into the machine housing 110 and for one or more of the purchaser interface components (such as those described below). The size and configuration of the machine housing can vary in accordance with the present disclosure.

The ticket collection receptacle 250 of the front door 200 is configured to receive lottery tickets from each of the movable ticket bursters 400*a*, 400*b*, and 400*c*. The ticket collection receptacle 250 is configured to hold each lottery ticket received from the movable ticket bursters to enable the respective purchaser to retrieve the dispensed lottery ticket from the ticket collection receptacle 250. The ticket collection receptacle defines an elongated horizontally extending ticket receiving slot 254 (best seen in FIGS. 3 and 4). The ticket collection receptacle 250 and the front door define an elongated horizontally extending purchase ticket retrieval slot 278 (best seen in FIG. 2). The purchase ticket retrieval slot 278 is (and needs to be) large enough so that a purchaser can insert the purchaser's hand through the purchase ticket retrieval slot 278 to retrieve lottery tickets that are dispensed into the ticket collection receptacle 250. The ticket receiving slot 254 is (and needs to be) small enough so that a purchaser cannot insert the purchaser's hand through the ticket receiving slot 254 and thereby cannot access any of the ticket drawers of the ticket drawer columns 300*a*, 300*b*, or 300*c*. The position, size, and configuration of the ticket collection receptacle can vary in accordance with the present disclosure.

Each of the ticket drawer columns 300*a*, 300*b*, and 300*c* are identical in this example embodiment. For brevity, only ticket drawer column 300*a* is described in detail herein. Likewise, the three movable ticket bursters 400*a*, 400*b*, and 400*c* are identical in this example embodiment. For brevity, only ticket burster 400*a* associated with the ticket drawer column 300*a* is described herein.

Ticket drawer column 300*a* includes a series of aligned ticket drawers (not individually labeled) that are vertically stacked in the column. Each of the ticket drawers is configured to hold one or more packs of lottery tickets such as instant lottery tickets for subsequent dispensing by the ticket vending machine 100. The ticket drawers can vary in quantity, size, and configuration depending upon the particular size of the ticket vending machine 100 and the quantity, size, and shapes of the lottery tickets that the ticket vending machine 100 can or will dispense. Each ticket drawer is configured to hold lottery tickets such as instant lottery tickets for selection by the purchasers. In various embodiments, the different ticket drawers can hold different lottery ticket packs for different lottery games, but it should be appreciated, that two or more ticket drawers can hold the same type of lottery tickets. In various embodiments, each of the ticket drawers is configured to feed each instant lottery ticket held by that ticket drawer into the associated ticket burster 400*a* when the ticket burster 400*a* is moved into alignment with such ticket drawer for receipt, bursting, and dispensing of that lottery ticket. Bursting of the lottery ticket is the industry term for separating a lottery ticket from a pack of lottery tickets held in a ticket drawer. In this example embodiment, the ticket drawers do not burst the lottery tickets and do not need any mechanisms for bursting the lottery tickets, but rather the moveable ticket burster 400*a* bursts the lottery tickets fed by the ticket drawers in the ticket drawer column 300*a* into that ticket burster 400*a*.

Figure 5:
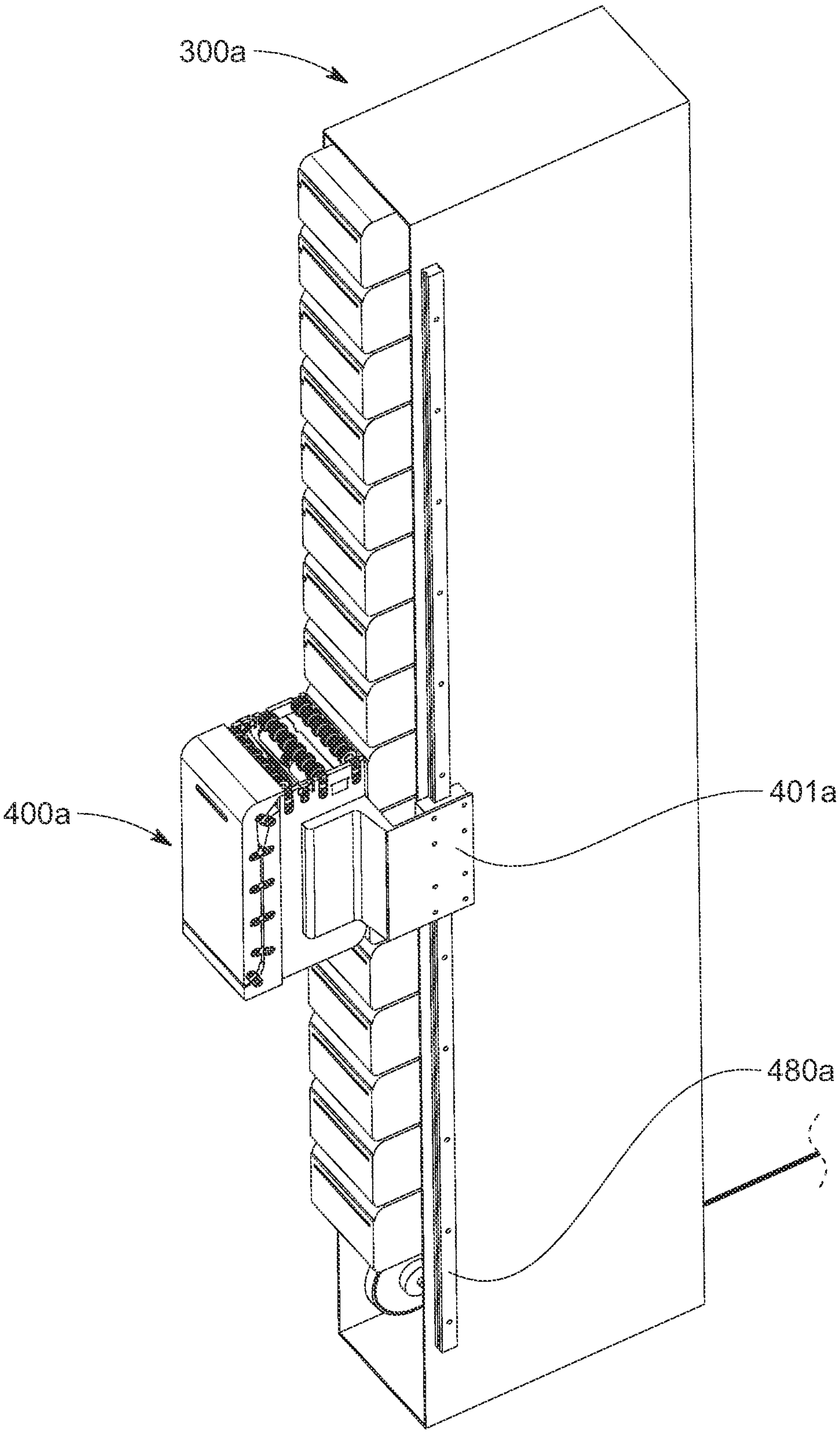
FIG. 5 is an enlarged fragmentary perspective view of one of the ticket drawer columns and the ticket burster associated with that ticket drawer column of the lottery ticket vending machine of FIG. 2.

As best shown in FIGS. 3, 4, and 5, the movable ticket burster 400*a* is supported by one or more burster supporters (such as burster supporter 480*a*). The burster supporters can be any suitable structure(s) that support(s) the ticket burster 400*a* in a manner that enables the ticket burster 400*a* to vertically move to any of the different ticket receipt positions that are associated with and in alignment with the respective ticket drawers of the ticket drawer column 300*a*. Each of the burster supporters also support the ticket burster 400*a* in a manner that enables the ticket burster 400*a* to vertically move to into alignment with the ticket receptacle 250.

The ticket vending machine 100 includes one or more actuators (not shown) that control movement of the ticket burster 400*a* under control of the controller of the ticket vending machine 100 and/or the controller of the ticket burster 400*a*. In this example, an actuator (not labeled) is mounted at the bottom of the ticket drawer column 300*a* and coupled to the ticket burster 400*a* by suitable linkages (such as but not limited to pulleys and a drive belt (not labeled)). The actuator is configured to move the ticket burster 400*a* under the control of the controller(s) in the vertical (e.g., up and down) directions. The movable ticket burster 400*a* is thus moveable, via this actuator and linkages on the ticket burster supporters to different vertical locations including a plurality of the locations respectively associated and aligned with each of the ticket drawers of the ticket drawer column 300*a* such that the ticket burster 400*a* is positioned to receive one or more of the lottery tickets stored in each respective ticket drawer of the ticket drawer column 300*a* for obtaining and dispensing that instant lottery ticket into the ticket receptacle 400 for the purchaser as requested by the purchaser.

Figure 6A:
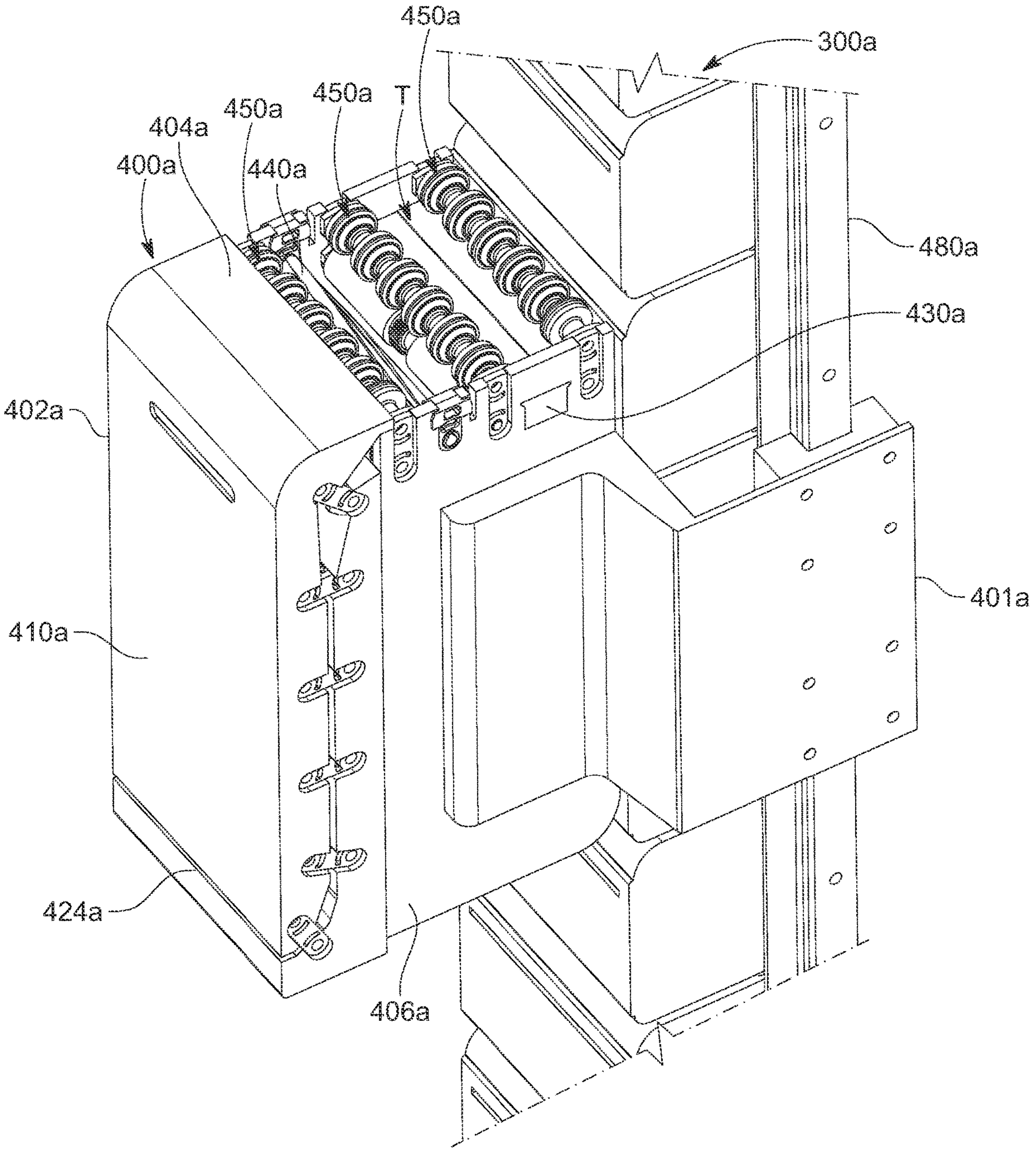
FIGS. 6A and 6B are enlarged fragmentary perspective views of the ticket drawer column and the ticket burster of FIG. 5, and showing a lottery ticket with a straight leading edge in the ticket burster.
Figure 6B:
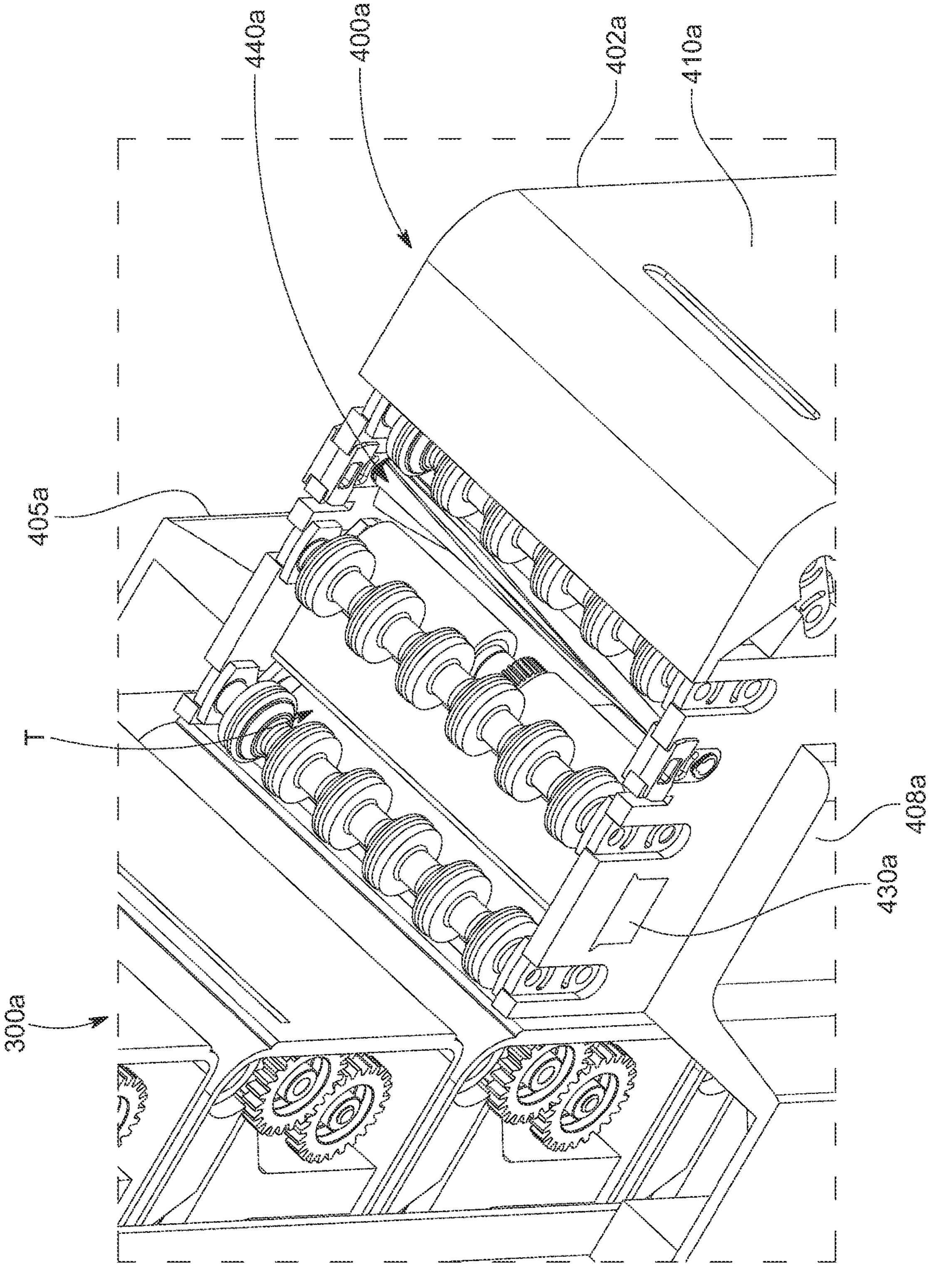
Figure 7:
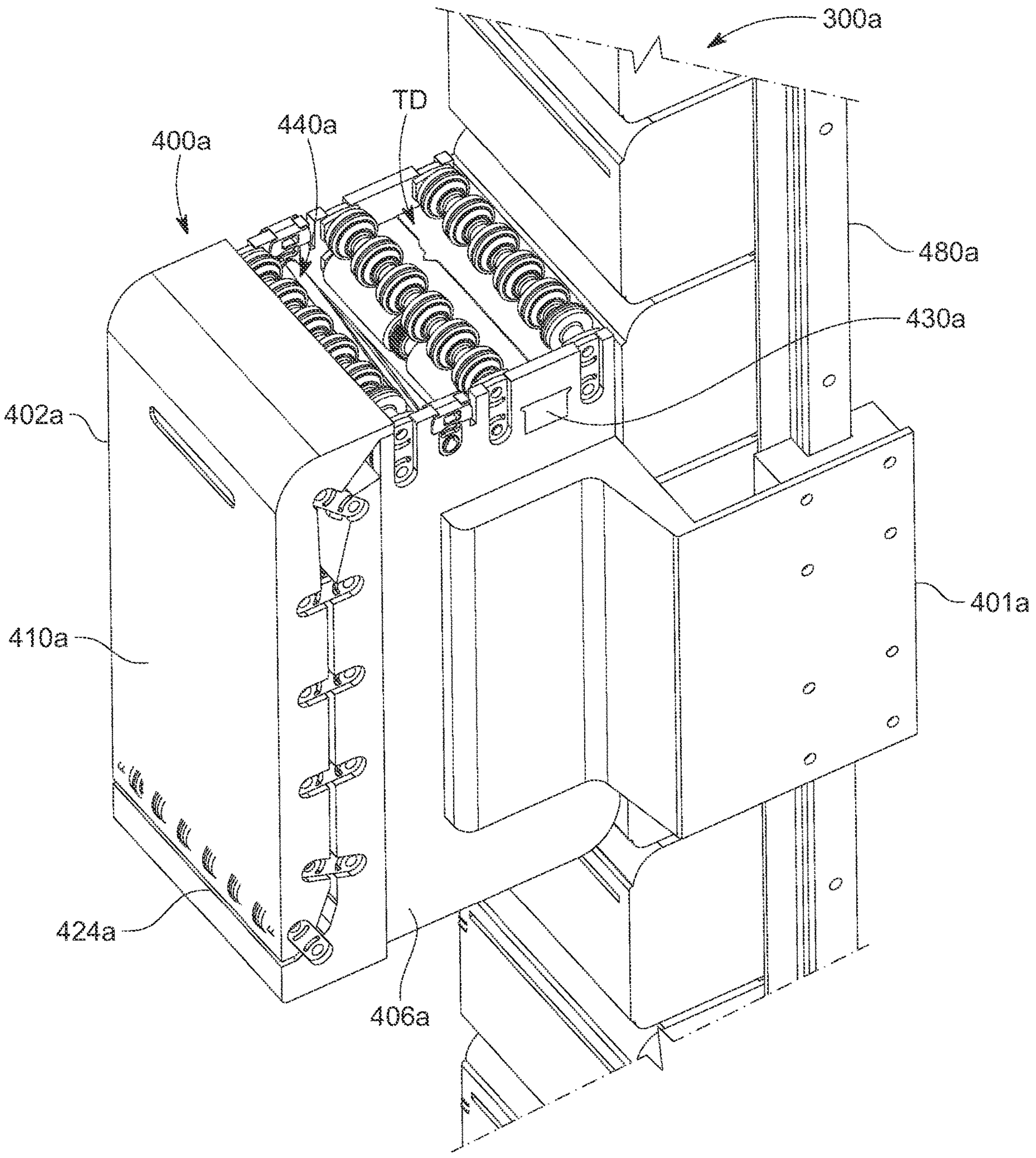
FIG. 7 is an enlarged fragmentary perspective view of the ticket drawer column and the ticket burster of FIG. 5, and showing a lottery ticket with a deformity in the ticket burster.

As best shown in FIGS. 6A, 6B, and 7, the example movable ticket burster 400*a* generally includes: (a) a burster housing 402*a*; (b) one or more burster supporter connecters (such as burster support connector 404*a* connecting the burster housing 402*a* and the burster supporter 480*a*); (c) a ticket edge sensor 430*a* in and supported by the burster housing 402*a*; (d) a ticket cutter 440*a* in and supported by the burster housing 402*a*; (e) a plurality of ticket engagers 450*a* supported by the burster housing 402*a*; and (f) a burster controller (not shown). The size and configuration of the ticket burster can vary in accordance with the present disclosure.

Figure 8:
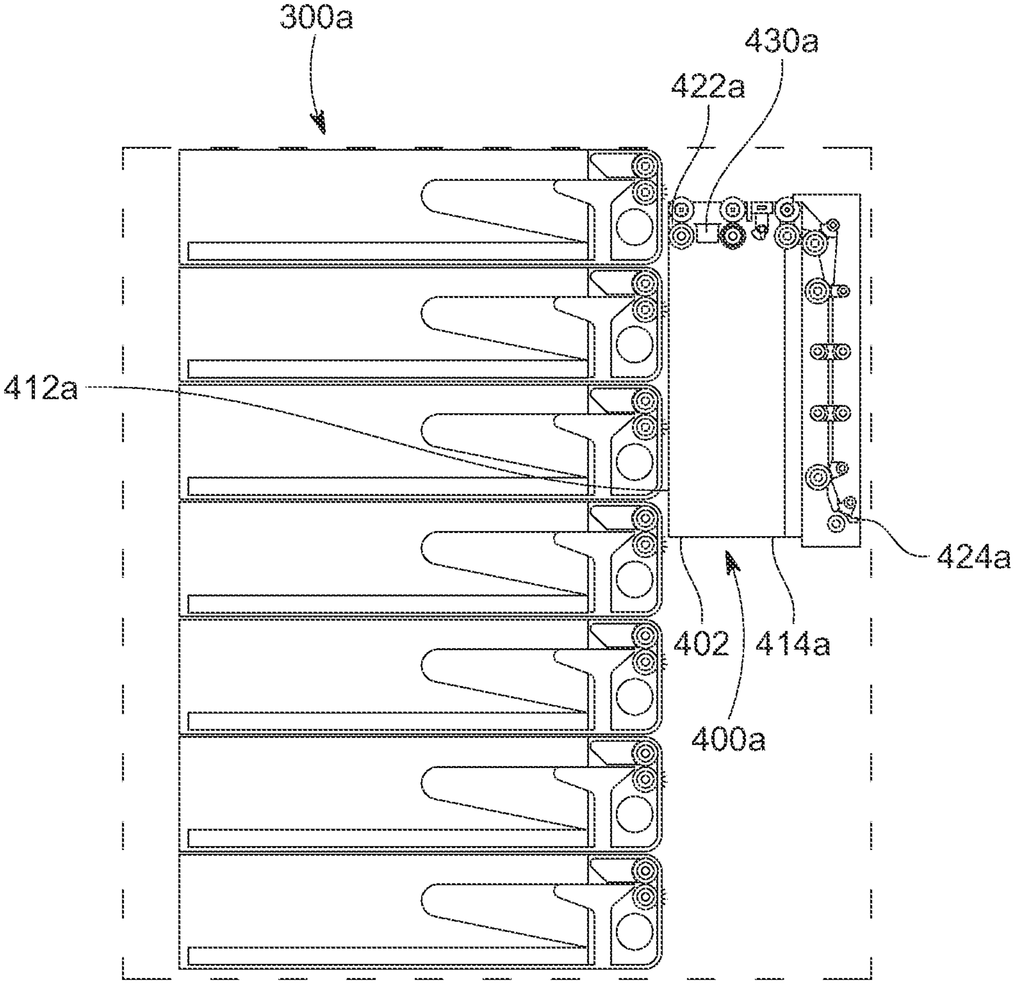
FIG. 8 is an enlarged fragmentary side view of the ticket drawer column and the ticket burster of FIG. 5.
Figure 9:
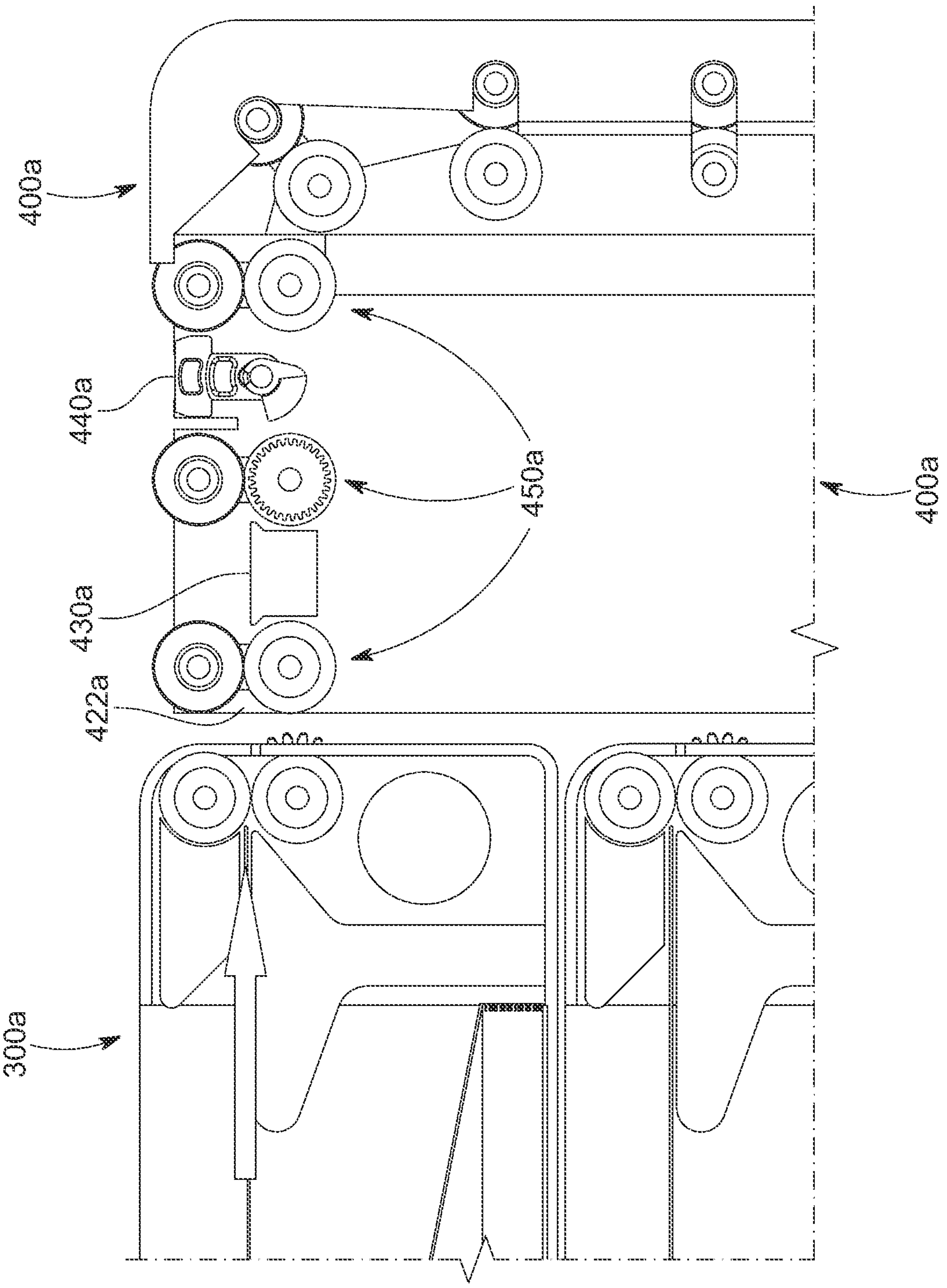
FIG. 9 is a further enlarged fragmentary side view of the ticket drawer column and the ticket burster of FIG. 5.

More specifically, the burster housing 402*a* generally includes a top member 404*a*, spaced-apart side members 406*a* and 408*a*, a front member 410*a*, a rear member 412*a* (see FIG. 8), and a bottom member 414*a* (see FIG. 8). The burster housing 402*a* also includes a plurality of internal members (not individually labeled) that define a ticket inlet 422*a* (see FIG. 8), through which the ticket burster 400*a* is configured to receive a lottery ticket (such as lottery ticket T in FIGS. 6A and 6B or lottery ticket TD in FIG. 7 further explained below) from a ticket drawer of the ticket drawer column 300*a*, a ticket outlet 424*a* through which the ticket burster 400*a* is configured to dispense the received instant lottery ticket into the ticket collection receptacle 250, and a ticket movement path (not labeled) extending from the ticket inlet 422*a* to the ticket outlet 424*a* and through which the lottery ticket is moved through the ticket burster 400*a*.

The ticket cutter 440*a* is positioned in the burster housing 402*a* and configured to rotate to cut the perforations attaching each instant lottery ticket that moves along the ticket movement path in the ticket burster 400*a* to the next instant lottery ticket of the continuous strip of lottery tickets received from the respective ticket drawer. The ticket cutter 440*a* is configured to make such cut along the perforations between the two connected instant lottery tickets of such strip. The ticket cutter 440*a* is controlled by the burster controller and/or the controller of the ticket vending machine 100. In this example embodiment, the ticket cutter 440*a* is inwardly positioned (i.e., positioned downstream) from the ticket inlet 422*a*. After the ticket cutter 440*a* cuts the instant lottery ticket requested by the purchaser from the respective ticket drawer, the ticket drawer can retract the portion of the next instant lottery ticket (of the strip of lottery tickets) from the ticket burster 400*a* before the ticket burster 400*a* moves from the ticket receipt position aligned with that ticket drawer. In other embodiments, the ticket burster 400*a* can be configured such that the ticket cutter is positioned closer to or on the other side of the ticket inlet (i.e., positioned upstream of the ticket inlet) such that after the ticket cutter cuts the lottery ticket along the perforations connecting that lottery ticket to the next lottery ticket in the strip, the ticket drawer may not need to withdraw the next instant lottery ticket in the strip or may only need to withdraw the next instant lottery ticket in the strip a relatively small distance. The position, size, and configuration of the ticket cutter can thus vary in accordance with the present disclosure.

In other embodiments, the ticket burster 400*a* can be configured such that the burster housing 402*a* is rotatable about a horizontal axis to separate (via a tearing and/or twisting motion) each instant lottery ticket along the perforations connecting that instant lottery ticket to the next lottery ticket in the strip. In such embodiments, the ticket drawer may not need to withdraw the next instant lottery ticket of the strip or may only need to withdraw the next instant lottery ticket of the strip a relatively small distance. In such embodiments, the ticket burster may not need a ticket cutter.

It should be appreciated that the ticket burster 400*a* is thus configured to burst the perforations between the lottery ticket being dispensed and the next lottery ticket of the strip so as to enable the dispensed lottery ticket to be dispensed into the ticket receptacle 250. This prevents a person from improperly tearing a lottery ticket or being able to pull an extended number of lottery tickets from one of the ticket packs in one of the ticket drawers. It should be appreciated that the ticket burster 400*a* can be moved to a dispensing location for each instant lottery ticket dispensed, or for only certain of the lottery tickets dispensed. It should also be appreciated that the ticket burster can moved to a different location for any lottery ticket that is deemed to be bad or non-dispensable for any reason, and to deposit that ticket into a suitable rejection area.

It should be appreciated that the ticket vending machine of the present disclosure can have more than one ticket burster for each ticket drawer column such that they can operate at the same time, or such that one or more ticket bursters are back-ups in case there is an issue with one of the other ticket bursters for that ticket drawer column.

The ticket engagers 450*a* in this example embodiment include multiple driven rollers (not labeled) and multiple guide rollers (not labeled). The driven rollers are rotated by suitable actuators (not shown) under the control of the burster controller and/or the controller of the ticket vending machine 100. The driven rollers and the guide rollers are configured to move (such as by pulling) and guide each lottery ticket along the ticket movement path and out of the ticket outlet 424*a*. In alternative embodiments, the ticket engagers are configured to grip and pull each lottery ticket from the respective ticket drawer.

The burster controller (not shown) can be any suitable type of controller (such as a programmable logic controller) that includes any suitable processing device(s) (such as a microprocessor, a microcontroller-based platform, an integrated circuit, or an application-specific integrated circuit) and any suitable memory device(s) (such as random access memory, read-only memory, or flash memory). The memory device(s) stores instructions executable by the processing device(s) to control operation of the ticket burster 400*a*. The burster controller can be hard wired or wirelessly connected to and in communication with the cutter 440*a*, the actuators for the driven rollers 450*a*, any actuators of the ticket burster 400*a* that cause the movement of the ticket burster 400*a*, and the ticket edge sensor 430*a* (as further described below). In such embodiments, the burster controller can be wirelessly connected to and in communication with the controller of the ticket vending machine 100. In other embodiments, the ticket burster does not include a controller and is completely controlled by the controller of the ticket vending machine 100. In such embodiments, the controller of the ticket vending machine 100 can be hard wired to or wirelessly connected to and in communication with the cutter, the actuators for the driven rollers, any actuators on the ticket burster or the burster supporter that cause the movement of the ticket burster, and the ticket edge sensor.

The ticket edge sensor 430*a* of the ticket burster 400*a* is positioned in and supported by the housing 402*a* of the ticket burster 400*a*. The ticket edge sensor 430*a* extends transversely along the entire or substantially the entire width of the ticket burster 430*a* such that it can obtain an image of the entire width of the leading edge of each lottery ticket that moves through the ticket burster 400*a* as that lottery ticket moves above the ticket edge sensor 430*a*. In this example embodiment, the ticket edge sensor 430*a* is below the ticket movement path and thus scans upwardly toward the lottery ticket. In other alternative embodiments that are not shown, the ticket edge sensor 430*a* is above the ticket movement path and thus scans downwardly toward the lottery ticket. The ticket edge sensor 430*a* is configured to obtain an image of the entire leading edge (and in some embodiments the surrounding forwardly extending and/or rearwardly extending areas) of each lottery ticket as that lottery ticket moves from the ticket drawer into the ticket burster 400*a* and before it reaches the ticket cutter 440*a*. In other words, the ticket edge senor 430*a* is configured to scan the entire leading edge of the lottery ticket as that lottery ticket moves in the ticket movement path and through a scan area above the ticket edge senor 430*a*. The ticket edge senor 430*a* is configured to communicate leading edge related image data (regarding the leading edge of the lottery ticket) to the burster controller and/or the controller of the ticket vending machine 100. The burster controller and/or the controller of the ticket vending machine 100 are configured to analyze (such as by using machine vision or other suitable image analysis techniques) this leading edge related image data and determine if the leading edge of the lottery ticket is a straight edge (such as the lottery ticket T shown in FIGS. 6A and 6B) without any deformities or has any deformities (such as the deformity in the lottery ticket TD shown in FIG. 7).

If the burster controller and/or the controller of the ticket vending machine 100 determines that the leading edge of the lottery ticket is a straight edge without any deformities (such as the lottery ticket T shown in FIGS. 6A and 6B), the burster controller and/or the controller of the ticket vending machine 100 does not need to take any corrective actions.

If the burster controller and/or the controller of the ticket vending machine 100 determines that the leading edge of the lottery ticket has one or more deformities (such as the lottery ticket TD shown in FIG. 7), the burster controller and/or the controller of the ticket vending machine 100 can take one or more of a series of different corrective actions. In various different embodiments, the respective corrective action taken in such case can vary and can be any one or more of the following example corrective actions: (1) cause a display of a warning message on a display device of the vending machine 100 to alert an operator of the vending machine 100 regarding the deformity issue (such as a ticket cutting issue) to enable the operator to act on such issue and fix the issue; (2) send a warning message to a remote monitoring device separate from the vending machine regarding the issue with the deformity issue (such as a ticket cutting issue) to enable an operator to act on such issue and fix the issue; and/or (3) automatically make an adjustment to one or more of the components of the vending machine 100 to attempt to address the deformity issue (such as a ticket cutting issue). In various embodiments, the corrective action can include the controller(s) making one or more automatic adjustments of the cutting system of the vending machine. In various embodiments, the corrective action can include the controller(s) making one or more automatic adjustments of the positioning of tickets relative to the ticket cutter of the ticket burster 400*a* to improve such cutting.

It should be appreciated that by regularly scanning leading ticket edges of lottery tickets for deformities, the vending machine will be able to catch and cause such issues to be properly addressed before such issues cause lottery tickets that are undesired in look and feel, and/or not redeemable to be dispensed by the ticket vending machine.

An example method of operation of the ticket vending machine 100 is now described. It should be appreciated that the following example is not the only method of operation of the ticket vending machine of the present disclosure, and other methods of operation are within the scope of the present disclosure. It should also be appreciated that the operations are controlled by the controller of the ticket vending machine and/or the controller of the ticket bursters, and that the descriptions provided below of the steps are controlled by such controllers.

This example is when a purchaser desires to purchase a single instant lottery ticket from the ticket vending machine 100. Responsive to and after the purchaser selects the lottery ticket (from the plurality of different lottery tickets available from the ticket vending machine 100) using the purchaser interface component(s) and specifically using one or more of the input devices and one or more of the payment acceptors to select and pay for the lottery ticket, the ticket vending machine 100 generally causes the ticket burster 400*a* to obtain and dispense that lottery ticket into the ticket collection receptacle 250. More specifically, this includes: (1) moving the ticket burster 400*a* into a ticket receipt position associated with and in alignment with the ticket drawer of the ticket draw column 300*a* that holds the lottery ticket pack of the selected type of lottery ticket requested by the purchaser; (2) causing the ticket drawer to feed a leading edge of the leading (such as the top most) lottery ticket of the pack in that ticket drawer into the ticket inlet 422*a* of the ticket burster 400*a* (with the front face of the lottery ticket facing upwardly); (3) causing the ticket engagers 450*a* to engage and cause that lottery ticket to move along the ticket movement path of the ticket burster 400*a*; (4) at the appropriate time when the leading edge of that lottery ticket passes through a scan area above the ticket edge sensor 430*a* to sense the leading edge of that lottery ticket, and send ticket edge image data to the burster controller and/or the controller of the ticket vending machine 100; (5) at the appropriate time when the perforations connecting that instant lottery ticket to the next lottery ticket of that strip are aligned with the ticket cutter 440*a*, causing the ticket cutter 440*a* to cut the perforations and thus separate that lottery ticket from the next lottery ticket in the strip; (6) causing the ticket drawer to retract any portion of that next lottery ticket of the strip from the ticket burster 400*a*; (7) causing the ticket burster 400*a* to move into alignment with the ticket collection receptacle 250; and (8) causing the ticket engagers 450*a* to move the separated lottery ticket along the ticket movement path toward and out of the ticket outlet 424*a*, and into the ticket collection receptacle 250. The method can include the controller of the ticket vending machine 100 also sending suitable data related to the dispensed lottery ticket to a central lottery server (not shown) for verification of that lottery ticket for possible subsequent redemption.

If the burster controller and/or the controller of the ticket vending machine 100 determines based on the ticket edge image data that the leading edge of the lottery ticket has a deformity (such as the lottery ticket TD shown in FIG. 7), the burster controller and/or the controller of the ticket vending machine 100 can take one or more of the series of corrective actions described above. In various embodiments, since the ticket vending machine 100 is regularly monitoring the leading edges of the dispensed lottery tickets, the ticket vending machine 100 will often be able to detect a deformity problem before the problem becomes severe enough to cause the ticket vending machine to shut down and stop dispensing lottery tickets. In various embodiments, when the ticket vending machine 100 detects a deformity problem that is severe, the controller(s) can cause the ticket vending machine to shut down and stop dispensing lottery tickets.

In various embodiments, the controller of the ticket vending machine can maintain data regarding the length of each lottery ticket from its leading edge to the trailing edge, so the controller knows when to obtain images of the leading edges of the lottery tickets.

In various embodiments, the ticket vending machine can alternatively or additionally scan, obtain, and analyze trailing edge image data relating to the trailing edge of each lottery ticket after the lottery ticket has been separated from the next lottery ticket by the cutter. In such cases, the ticket edge sensor 430*a* would be positioned to scan the tailing edge of each lottery ticket after it has been cut by the cutter.

In various other embodiments, the ticket edge sensors can be positioned on each of the drawers instead of or in addition to the ticket bursters. Such ticket vending machine can alternatively or additionally scan, obtain, and analyze edge image data relating to the edge of each lottery ticket.

In various embodiments, the ticket edge sensor includes a camera configured to take one or more images of the edge of the lottery ticket (such as the leading edge), create ticket edge image data, and send the ticket edge image data to the controller(s) for analysis.

In various embodiments, the ticket edge sensor includes a plurality of adjacent optical sensors configured obtain ticket edge data (relative to the entire ticket edge), and send the ticket edge image data to the controller(s) for analysis.

In various embodiments, the ticket edge sensor includes a compact image sensor ("CIS") reader that is configured to read bar codes on the lottery tickets and additionally configured to obtain images of the ticket edges and send ticket edge image data to the controller(s) for analysis.

It should be appreciated from the above that various embodiments of the present disclosure provide a lottery ticket vending machine including: (1) a housing; (2) a ticket drawer column in the housing, the ticket drawer column comprising a plurality of ticket drawers, each of the ticket drawers configured to hold a strip of lottery tickets; (3) a ticket burster in the housing, the ticket burster defining a ticket inlet and a ticket outlet, the ticket burster movable to a plurality of different ticket receipt positions, each different ticket receipt position associated with and in alignment with a different one of the ticket drawers; (4) a ticket edge sensor supported by the ticket burster, configured to obtain ticket edge image data for a lottery ticket that moves from one of the ticket drawers into the ticket burster, and configured to transmit the ticket edge image data; and (5) a controller configured to receive the ticket edge image data from the ticket edge sensor, determine if any part of an edge of the lottery ticket has a deformity, and cause a corrective action to be taken responsive to determining that the edge of the lottery ticket has the deformity. In various such embodiments, the ticket edge sensor comprises a camera configured to obtain and create the ticket edge image data. In various such embodiments, the ticket edge sensor comprises a plurality of optical sensors configured to obtain and create the ticket edge image data. In various such embodiments, the edge of the lottery ticket is the leading edge of the lottery ticket. In various such embodiments, the ticket edge sensor is positioned in the ticket burster such that the ticket edge sensor is configured to sense the leading edge of the lottery ticket before a cutter of the ticket burster cuts perforations connecting the lottery ticket to a next lottery ticket of the strip of lottery tickets. In various such embodiments, the vending machine includes a display device and wherein the corrective action comprises causing a display by the display device of an indication of a ticket edge deformity issue. In various such embodiments, the corrective action comprises sending a message to a remote monitoring device separate from the vending machine regarding an indication of a ticket edge deformity issue. In various such embodiments, the corrective action comprises adjusting a position of a subsequent lottery ticket relative to the cutter of the ticket burster.

It should further be appreciated from the above that various embodiments of the present disclosure provide a lottery ticket vending machine including: (1) a housing; (2) a ticket drawer column in the housing, the ticket drawer column comprising a plurality of ticket drawers, each of the ticket drawers configured to hold a strip of lottery tickets; (3) a ticket burster in the housing, the ticket burster defining a ticket inlet and a ticket outlet, the ticket burster movable to a plurality of different ticket receipt positions, each different ticket receipt position associated with and in alignment with a different one of the ticket drawers; (4) a ticket cutter supported by the ticket burster; (5) a ticket edge sensor supported by the ticket burster, configured to obtain ticket edge image data for a lottery ticket that moves from one of the ticket drawers into the ticket burster, and configured to transmit the ticket edge image data, wherein the ticket edge sensor comprises one of a camera and an optical sensor, wherein the ticket edge sensor is positioned in the ticket burster such that the ticket edge sensor can sense a leading edge of the lottery ticket before the cutter cuts perforations connecting the lottery ticket to a next lottery ticket of the strip of lottery tickets; and (6) a controller configured to receive the ticket edge image data from the ticket edge sensor, determine if the leading edge of the lottery ticket has a deformity based on the ticket edge image data, and cause a corrective action to be taken responsive to determining that the leading edge of the lottery ticket has the deformity. In various such embodiments, the vending machine include a display device and wherein the corrective action comprises causing a display by the display device of an indication of a ticket edge deformity issue. In various such embodiments, the corrective action comprises sending a message to a remote monitoring device separate from the vending machine regarding an indication of a ticket edge deformity issue. In various such embodiments, the corrective action comprises adjusting a position of a subsequent lottery ticket relative to the cutter of the ticket burster.

It should further be appreciated from the above that various embodiments of the present disclosure provide a lottery ticket vending machine including: (1) a housing; (2) a lottery ticket drawer supported by the housing; (3) a ticket burster supported by the housing; (4) a sensor supported by the housing; and (5) a controller supported by the housing, wherein the controller is configured to operate with the sensor to determine if the ticket burster is properly separating lottery tickets received from the ticket drawer, and to cause a corrective action to be taken responsive to determining that the ticket burster is improperly separating the lottery tickets. In various such embodiments, the corrective action comprises an adjustment of a component of the ticket burster. In various such embodiments, the corrective action comprises an adjustment of position of a subsequent lottery ticket relative to a cutter of the ticket burster. In various such embodiments, the corrective action comprises sending an alert to a monitoring device. In various such embodiments, the vending machine includes a display device, wherein the corrective action comprises a display by the display device of an alert indicating that the ticket burster is improperly separating the lottery tickets. In various such embodiments, the sensor comprises a camera configured to obtain images of leading edges of the lottery tickets. In various such embodiments, the sensor is configured to create the ticket edge image data relating to leading edges of the lottery tickets. In various such embodiments, the sensor comprises a plurality of optical sensors configured to create the ticket edge image data relating to leading edges of the lottery tickets.

It should also be appreciated from the above that the movable ticket burster of the present disclosure can replace the multiple stationary dispensing devices that are respectively mounted in front of each of the respective ticket drawers in various known instant lottery ticket vending machines. It should also be appreciated that by eliminating the multiple stationary dispensing devices, a greater quantity of ticket drawers can be employed than in various known instant lottery ticket vending machines.

Various changes and modifications to the present embodiments described herein will be apparent to those skilled in the art. Such changes and modifications can be made without departing from the spirit and scope of the present subject matter and without diminishing its intended technical scope. It is therefore intended that such changes and modifications be covered by the appended claims.

The claims are as follows:

1. A lottery ticket vending machine comprising:

a housing;

a ticket drawer column in the housing, the ticket drawer column comprising a plurality of ticket drawers, each of the ticket drawers configured to hold a strip of lottery tickets;

a ticket burster in the housing, the ticket burster defining a ticket inlet and a ticket outlet, the ticket burster movable to a plurality of different ticket receipt positions, each different ticket receipt position associated with and in alignment with a different one of the ticket drawers;

a ticket edge sensor supported by the ticket burster and movable with the ticket burster, the ticket edge sensor configured to obtain ticket edge image data for a lottery ticket that moves from one of the ticket drawers into the ticket burster, and configured to transmit the ticket edge image data; and a controller configured to receive the ticket edge image data from the ticket edge sensor, determine if any part of an edge of the lottery ticket has a deformity, and cause a corrective action to be taken to address the deformity responsive to determining that the edge of the lottery ticket has the deformity.

2. The lottery ticket vending machine of claim 1, wherein the ticket edge sensor comprises a camera configured to obtain and create the ticket edge image data.

3. The lottery ticket vending machine of claim 1, wherein the ticket edge sensor comprises a plurality of optical sensors configured to obtain and create the ticket edge image data.

4. The lottery ticket vending machine of claim 1, wherein:

the edge of the lottery ticket is the leading edge of the lottery ticket; and the controller is configured to determine based on the ticket edge image data if the leading edge of the lottery ticket is one of a straight leading edge and a non-straight leading edge.

5. The lottery ticket vending machine of claim 1, wherein the ticket edge sensor is positioned in the ticket burster such that the ticket edge sensor is configured to sense the leading edge of the lottery ticket before a cutter of the ticket burster cuts perforations connecting the lottery ticket to a next lottery ticket of the strip of lottery tickets.

6. The lottery ticket vending machine of claim 1, which comprises a display device and wherein the corrective action comprises causing a display by the display device of an indication of a ticket edge deformity issue.

7. The lottery ticket vending machine of claim 1, wherein the corrective action comprises sending a message to a remote monitoring device separate from the vending machine regarding an indication of a ticket edge deformity issue.

8. The lottery ticket vending machine of claim 1, wherein the corrective action comprises adjusting a position of a subsequent lottery ticket relative to the cutter of the ticket burster.

9. A lottery ticket vending machine comprising:

a housing;

a ticket drawer column in the housing, the ticket drawer column comprising a plurality of ticket drawers, each of the ticket drawers configured to hold a strip of lottery tickets;

a ticket burster in the housing, the ticket burster defining a ticket inlet and a ticket outlet, the ticket burster movable to a plurality of different ticket receipt positions, each different ticket receipt position associated with and in alignment with a different one of the ticket drawers;

a ticket cutter supported by the ticket burster;

a ticket edge sensor supported by the ticket burster and movable with the ticket burster, the ticket edge sensor configured to obtain ticket edge image data for a lottery ticket that moves from one of the ticket drawers into the ticket burster, and configured to transmit the ticket edge image data, wherein the ticket edge sensor comprises one of a camera and an optical sensor, wherein the ticket edge sensor is positioned in the ticket burster such that the ticket edge sensor can sense a leading edge of the lottery ticket before the cutter cuts perforations connecting the lottery ticket to a next lottery ticket of the strip of lottery tickets; and a controller configured to receive the ticket edge image data from the ticket edge sensor, determine if the leading edge of the lottery ticket has a deformity based on the ticket edge image data, and cause a corrective action to be taken to address the deformity responsive to determining that the leading edge of the lottery ticket has the deformity.

10. The lottery ticket vending machine of claim 9, which comprises a display device and wherein the corrective action comprises causing a display by the display device of an indication of a ticket edge deformity issue.

11. The lottery ticket vending machine of claim 9, wherein the corrective action comprises sending a message to a remote monitoring device separate from the vending machine regarding an indication of a ticket edge deformity issue.

12. The lottery ticket vending machine of claim 9, wherein the corrective action comprises adjusting a position of a subsequent lottery ticket relative to the cutter of the ticket burster.

13. A lottery ticket vending machine comprising:

a housing;

a lottery ticket drawer supported by the housing;

a ticket burster supported by the housing, the ticket burster movable to the lottery ticket drawer and configured to receive and separate lottery tickets from the lottery ticket drawer;

a sensor supported by the ticket burster and movable with the ticket burster; and a controller supported by the housing, the controller configured to operate with the sensor to determine if the ticket burster is properly separating the lottery tickets received from the lottery ticket drawer, and to cause a corrective action to be taken to address improper ticket separation responsive to determining that the ticket burster is improperly separating the lottery tickets.

14. The lottery ticket vending machine of claim 13, wherein the corrective action comprises an adjustment of a component of the ticket burster.

15. The lottery ticket vending machine of claim 13, wherein the corrective action comprises an adjustment of a position of a subsequent lottery ticket relative to a cutter of the ticket burster.

16. The lottery ticket vending machine of claim 13, wherein the corrective action comprises sending an alert to a monitoring device.

17. The lottery ticket vending machine of claim 13, which comprises a display device, wherein the corrective action comprises a display by the display device of an alert indicating that the ticket burster is improperly separating the lottery tickets.

18. The lottery ticket vending machine of claim 13, wherein the sensor comprises a camera configured to obtain images of leading edges of the lottery tickets.

19. The lottery ticket vending machine of claim 13, wherein the sensor is configured to create ticket edge image data relating to leading edges of the lottery tickets.

20. The lottery ticket vending machine of claim 13, wherein the sensor comprises a plurality of optical sensors configured to create the ticket edge image data relating to leading edges of the lottery tickets.

* * * * *